(12) United States Patent
Riedel et al.

(10) Patent No.: US 11,279,657 B2
(45) Date of Patent: Mar. 22, 2022

(54) MULTI-PHASE INFRARED TRANSPARENT CERAMIC MATERIAL

(71) Applicant: Raytheon Company, Waltham, MA (US)

(72) Inventors: Eric K. Riedel, North Andover, MA (US); Thomas M. Hartnett, Nashua, NH (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/899,272

(22) Filed: Jun. 11, 2020

(65) Prior Publication Data

US 2021/0221742 A1 Jul. 22, 2021

Related U.S. Application Data

(60) Provisional application No. 62/879,868, filed on Jul. 29, 2019.

(51) Int. Cl.
*C04B 35/505* (2006.01)
*C04B 35/04* (2006.01)
(Continued)

(52) U.S. Cl.
CPC ............ *C04B 35/505* (2013.01); *C04B 35/04* (2013.01); *G01J 1/0407* (2013.01); *G01J 1/42* (2013.01); *C04B 2235/3206* (2013.01); *C04B 2235/3208* (2013.01); *C04B 2235/3224* (2013.01); *C04B 2235/3225* (2013.01);
(Continued)

(58) Field of Classification Search
CPC .... C04B 35/053; C04B 35/505; G01J 1/0407; G01J 1/42
See application file for complete search history.

(56) References Cited

U.S. PATENT DOCUMENTS 3,764,643 A * 10/1973 Muta ..................... C04B 35/505
264/1.21
9,017,765 B2 * 4/2015 Sun ......................... C04B 41/86
427/376.1
(Continued)

OTHER PUBLICATIONS

"International Application Serial No. PCT US2020 037275, International Search Report dated Sep. 16, 2020", 3 pgs.
(Continued)

*Primary Examiner* — Karl E Group
(74) *Attorney, Agent, or Firm* — Schwegman Lundberg & Woessner, P.A.

(57) ABSTRACT

Various embodiments disclosed relate to an optical window including an infrared light transmissive optical material. The optical material includes a first ceramic phase including a first ceramic material and a first dopant distributed therein. The optical material further includes a second ceramic phase homogenously intermixed with the first ceramic phase and comprising a second ceramic material and a second dopant distributed therein. The first dopant increases the refractive index of the first ceramic material and the second dopant decreases the refractive index of the second ceramic material. The first dopant and the second dopant are present in an amount such that a difference in a refractive index of the first ceramic phase and of the second ceramic phase is in a range of from about 0.001 to about 0.2.

23 Claims, 4 Drawing Sheets

(51) Int. Cl.
*G01J 1/04* (2006.01)
*G01J 1/42* (2006.01)
(52) U.S. Cl.
CPC .. *C04B 2235/3284* (2013.01); *C04B 2235/80* (2013.01); *C04B 2235/9646* (2013.01)

(56) References Cited

U.S. PATENT DOCUMENTS

| | | | |
|---|---|---|---|
| 9,395,467 B2 * | 7/2016 | Zelinski | B82Y 30/00 |
| 2006/0011839 A1 | 1/2006 | Zhan et al. | |
| 2011/0315807 A1 | 12/2011 | Sunne | |
| 2011/0315808 A1 * | 12/2011 | Zelinski | B82Y 20/00 |
| | | | 244/3.16 |
| 2013/0342921 A1 | 12/2013 | Sunne et al. | |

OTHER PUBLICATIONS

"International Application Serial No. PCT US2020 037275, Written Opinion dated Sep. 16, 2020", 6 pgs.

* cited by examiner

MULTI-PHASE INFRARED TRANSPARENT CERAMIC MATERIAL

CLAIM OF PRIORITY

This patent application claims the benefit of priority to U.S. Application Ser. No. 62/879,868, filed Jul. 29, 2019, which is incorporated by reference herein in its entirety.

BACKGROUND

Ceramic materials can be used to form structures that are transparent to various wavelengths of electromagnetic radiation. However, certain ceramic materials may not have enough structural integrity to be exposed to extreme forces or temperatures. Additionally, where ceramic materials include multiple materials, mismatches in the refractive index of each material can affect the transmissivity and emittance of the ceramic material.

SUMMARY OF THE DISCLOSURE

Various embodiments disclosed relate to an optical window. An example of a suitable optical window is a radome. The optical window includes an infrared light transmissive optical material. The optical material includes a first ceramic phase including a first ceramic material and a first dopant distributed therein. The optical material further includes a second ceramic phase homogenously intermixed with the first ceramic phase and comprising a second ceramic material and a second dopant distributed therein. The first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant. The first dopant and the second dopant are present in an amount such that a difference in a refractive index of the first ceramic phase and of the second ceramic phase is in a range of from about 0.001 to about 0.2.

Various embodiments disclosed relate to a multi-spectral sensor. The sensor includes an infrared light transmissive optical material. The optical material includes a first ceramic phase including a first ceramic material and a first dopant distributed therein. The optical material further includes a second ceramic phase homogenously intermixed with the first ceramic phase and comprising a second ceramic material and a second dopant distributed therein. The first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant. The first dopant and the second dopant are present in an amount such that a difference in a refractive index of the first ceramic phase and of the second ceramic phase is in a range of from about 0.001 to about 0.2. The sensor further includes an infrared light sensor responsive to infrared light optically coupled to the infrared light transmissive optical material. The sensor further includes processing circuitry to process output signals of the infrared light sensor.

Various embodiments disclosed relate to an infrared light transmissive optical material. The optical material includes a first ceramic phase including a first ceramic material and a first dopant distributed therein. The optical material further includes a second ceramic phase homogenously intermixed with the first ceramic phase and comprising a second ceramic material and a second dopant distributed therein. The first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant. The first dopant and the second dopant are present in an amount such that a difference in a refractive index of the first ceramic phase and of the second ceramic phase is in a range of from about 0.001 to about 0.2.

BRIEF DESCRIPTION OF THE FIGURES

The drawings illustrate generally, by way of example, but not by way of limitation, various embodiments discussed in the present document.

DETAILED DESCRIPTION

Figure 1A:
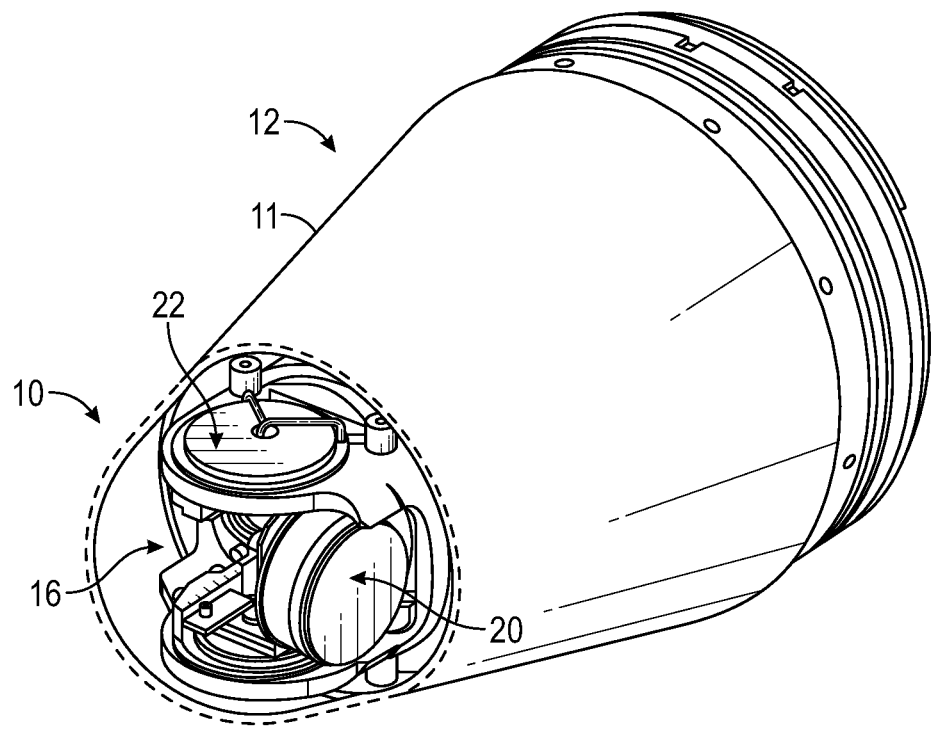
FIGS. 1A and 1B show isometric and section views of the nose of a guided projectile incorporating a one-piece extended dome including a co-doped ceramic material in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "infrared (IR) spectrum" generally refers to electromagnetic radiation having a wavelength between 0.7 and 300 micrometers. The IR spectrum can be divided into ranges, which can vary depending on which scheme is used, such as a sensor response division scheme, an astronomy division scheme, a CIE scheme or the ISO 20473 scheme.

The term "visible range" refers to radiation having a wavelength range of about 0.4 to about 0.75 µm. The term near infrared (NIR) can be considered to refer to radiation having a wavelength range of about 0.75 to about 1.4 µm, while the term "short wavelength infrared" (SWIR) can be considered to refer to a wavelength range of about 1.4 to about 3 µm. However, as used herein, except where noted, the term "short wavelength infrared" (SWIR) is intended to encompass both near infrared (NIR) and SWIR, and refers to radiation having a wavelength range from about 0.75 to about three (3) µm, with an "eye-safe" wavelength range considered to be from about 1.5 to about 1.8 µm. Mid wavelength infrared (MWIR), also referred to as "intermediate infrared", is generally considered to include radiation between about three (3) and about 8 µm, possibly up to about 8.5 µm. However, in guided missile applications, the about three (3) to about five (5) µm portion of this band is the atmospheric window in which the homing heads of passive IR "heat seeking" missiles are generally designed to work, homing on to the IR signature of a target. That is, this range is generally considered to be the range of wavelengths which can come through the atmosphere. Therefore, although most MWIR applications for the novel materials described herein may fall within the range of about three (3) to about five (5) µm, it is to be understood that embodiments directed to the MWIR spectrum, unless otherwise noted, are not so limited. Long wavelength infrared (LWIR), which is considered the "thermal imaging" region, generally refers to radiation having a wavelength of between about eight (8) (or possibly about 8.5 µm) up to about 15 µm, or from about 12 to 14 µm. Forward looking infrared (FLIR) systems use this area of the spectrum, sometimes also referred to as "far infrared" (FIR).

Airborne platforms carrying electro-optical (EO) sensors for such tasks as target acquisition, identification, guidance, and the like, are generally provided with an IR transparent dome or radome to protect the optical system. Projectiles, such as missiles, interceptors, guided projectiles, bombs, rockets, shells and sub-munitions, can have the dome in the front end. Behind this dome, and within the body of the projectile, an EO seeker can be provided for capturing electro-magnetic radiation (EMR) from the target, and conveying target information (e.g. bearing or images) to a guidance system, which, in turn, guides the projectile to an object or point within the captured images. Aircraft such as planes or helicopters can be provided with a directed infrared countermeasures (DIRCM) system to jam a missile seeker. This system may be mounted on the belly, tail section or elsewhere on the aircraft behind a protective dome. The dome is generally made of a transparent material that can sustain the aerodynamic and thermal stresses it may experience during missile or aircraft flight. In many conventional applications the dome is made of sapphire.

An alternate optical material, as opposed to sapphire to form the optical window from can be a ceramic material (e.g., a two-phase ceramic composite). However, where the ceramic material includes a plurality of phases, these materials may not be able to transmit light in desirable portions of the spectrum such as the SWIR and visible portions of the spectrum if the difference in the refractive indices of the respective phases is too large. If the difference is too large, scattering of the light at the shorter wavelengths associated with the visible and SWIR occurs, leading to opacity. Some designs have attempted to mitigate this in ceramic materials by only using a single phase ceramic material. However, these materials can often lack the strength to function when bearing the aerodynamic forces present during launch and flight of a guided projectile.

As a potential solution to these shortcomings, the instant disclosure describes various embodiments of optical materials that include an infrared light transmissive multi-phase co-doped ceramic material in which each phase is doped to help substantially match the refractive indices of each phase. For example, according to various embodiments, an optical material can include a first ceramic phase and a second ceramic phase, each ceramic phase being in a solid solution phase. A solid solution phase is a single phase region that has at least two different cations mixed together on the same crystal lattice, making it a homogeneous mixture or solution at the atomic level. Therefore, in contrast to mixtures of liquids which form a liquid solution, a solid solution has a crystal lattice (periodic arrangement of atoms).

According to various embodiments, the first ceramic phase and the second ceramic phase can independently be in a range of from about 5 vol % to about 95 vol % of the optical material, about 30 vol % to about 70 vol %, about 40 vol % to about 60 vol %, less than, equal to, or greater than about 5 vol %, 10, 15, 20, 25, 30, 35, 40, 45, 50, 55, 60, 65, 70, 75, 80, 85, 90, or about 95 vol %.

Each ceramic phase includes both a ceramic material and a dopant. Examples of suitable ceramic materials can include yttria ($Y_2O_3$), magnesia (MgO), aluminum oxide ($Al_2O_3$), a magnesium aluminum oxide ($MgAl_2O_4$), a carbide, an oxycarbide, a nitride, an oxynitride, a boride, an oxyboride, a sulfide, a selenide, a sulfo-selenide, or mixtures thereof. It is possible for the first ceramic phase and the second ceramic phases to include the same ceramic materials, but it is also possible for the first and second ceramic phases to have different ceramic materials. According to various embodiments, the first ceramic phase comprises yttria and the second ceramic phase comprises magnesia. The first ceramic material and the second ceramic material can independently be in a range of from about 10 wt % to about 95 wt % of the first ceramic phase and second ceramic phase, respectively, about 20 wt % to about 90 wt %, about 30 wt % to about 80 wt %, about 40 wt % to about 60 wt %, less than, equal to, or greater than about 10 wt %, 15, 20, 25, 30, 35, 40, 45, 50, 55, 60, 65, 70, 75, 80, 85, 90, or about 95 wt %. According to various embodiments, it is possible for there be some amount of interdiffusion of dopants from one ceramic phase to another, which can further reduce scatter and increase the in-line transmission. According to some embodiments, this can form a grain boundary phase (e.g., a third phase) that can have a thickness in a range of from about 1 nm to about 10 nm, about 2 nm to about 8 nm, about 4 nm, to about 6 nm, less than, equal to, or greater than about 1 nm, 1.5, 2, 2.5, 3, 3.5, 4, 4.5, 5, 5.5, 6, 6.5, 7, 7.5, 8, 8.5, 9, 9.5, or about 10 nm.

The dopant and the ceramic material can be homogenously mixed in their respective ceramic phases. The dopant in each of the first ceramic phase and second ceramic phase, respectively can be chosen from many suitable dopants. Examples of suitable dopants can include metal oxides such as calcium oxide, nickel(II) oxide, nickel(III) oxide, zinc oxide, aluminum oxide, antimony trioxide, antimony tetroxide, antimony pentoxide, arsenic trioxide, arsenic pentoxide, barium oxide, bismuth(III) oxide, bismuth(V) oxide, calcium oxide, cerium(III) oxide, cerium(IV) oxide, chromium(II) oxide, chromium(III) oxide, chromium(IV) oxide, cobalt(II) oxide, cobalt(II, III) oxide, cobalt(III) oxide, copper(I) oxide, copper(II) oxide, iron(II) oxide, iron(II, III) oxide, iron(III) oxide, lanthanum oxide, lead(II) oxide, lead (II, IV) oxide, lead(IV) oxide, lithium oxide, magnesium oxide, manganese(II) oxide, manganese(III) oxide, manganese(IV) oxide, manganese(VII) oxide, mercury(II) oxide, rubidium oxide, silicon dioxide, silver(I) oxide, thallium(I) oxide, thallium(III) oxide, thorium(IV) oxide, tin(II) oxide, tin(IV) oxide, tungsten(VI) oxide, scandium oxide, gadolinium oxide, or mixtures thereof. The first dopant and the second dopant can be the same dopant or a different dopant.

The first dopant and the second dopant can be independently present in the first ceramic phase and the second ceramic phase, respectively in a range of from about 0.5 wt % to about 50 wt %, about 2 wt % to about 20 wt %, about 5 wt % to about 10 wt %, less than, equal to, or greater than about 0.5 wt %, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 wt %.

Selection of the dopants can affect the properties of the ceramic materials of the respective ceramic phases. For example, the first dopant can increase the refractive index of the first ceramic material, relative to a refractive index of a corresponding first ceramic material that is free of the first dopant. Additionally, the second dopant can decrease the refractive index of the second ceramic material, relative to a refractive index of a corresponding second ceramic material that is free of the second dopant. By simultaneously increasing the refractive index of the first ceramic material and decreasing the refractive index of the second ceramic material, the difference between the respective refractive indices can be minimalized. For example, according to various embodiments, the difference in refractive indices can be in a range of from about 0.001 to about 0.20, about 0.001 to about 0.19, about 0.13 to about 0.18, about 0.14 to about 0.17, less than, equal to, or greater than about, 0.001, 0.005, 0.01, 0.02, 0.03, 0.04, 0.05, 0.06, 0.06, 0.07, 0.08, 0.09, 0.10, 0.11, 0.12, 0.13, 0.14, 0.15, 0.16, 0.17, 0.18, 0.19, or about 0.20. Stated alternatively, the difference in refractive indices can be in a range of from about 0% to about 6%, about 0.15% to about 6%, about 0.5% to about 1.5%, about 0.5% to about 1%, less than, equal to, or greater than about 0%, 0.15, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, or about 6%.

Additionally, the ceramic materials and dopants can be selected such that an in-line transmittance of infrared radiation of the optical element can be in a range of from about 50% to about 100% in the wavelength range of interest, about 90% to about 100%, less than equal to, or greater than about 50%, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or about 100%. The ceramic materials and dopants can further be selected such that the emittance of the optical material is in a range of from about 0 to about 0.3, about 0 to about 0.1, less than, equal to, or greater than about 0.01, 0.05, 0.1, 0.15, 0.2, 0.25, or about 0.3. A thickness of the sample can be in a range of from about 0.5 mm to about 5 mm, about 1 mm to about 3 mm, less than, equal to, or greater than about 0.5 mm, 1, 1.5, 2, 2.5, 3, 3.5, 4, 4.5, or about 5 mm.

Previous techniques to match refractive indices of separate ceramic phases involved only doping one ceramic phase to such a degree that the refractive index of the doped phase was raised or lowered to substantially match the refractive index of the un-doped ceramic phase. A drawback to this technique, however, is that matching the refractive indices would require so much of the dopant, that infrared radiation at certain wavelengths would then be absorbed by the dopant. However, according to various embodiments, co-doping each ceramic phase can allow for comparatively less of a single dopant to be included in either ceramic phase. This in-turn can result in the less absorbance of infrared radiation and higher transmission of infrared radiation across the infrared spectrum. Additionally, according to various embodiments, ability to potentially require less dopant to be included can be helpful allow for the use of a wide variety of potential dopants, that may only be able to slightly change a refractive index, to be used in various ceramic phases.

Any of the ceramic materials or dopants can be nanostructures. For example, any one or more of the ceramic materials of dopants can be a nanoparticle. Nanoparticles can be understood to refer to particles or grains having at least one dimension (e.g., height, width, or diameter) in a range of from about 1 nm to about 240 nm, about 100 nm to about 130 nm, about 20 nm to about 80 nm, about 40 nm to about 60 nm, less than, equal to, or greater than about 1 nm, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, or about 240 nm. Nanoparticles can conform to one of many different morphologies including a nanosphere, nanograin, or a nanobox. An aspect ratio of an individual nanoparticle can be about 1:1. Alternatively, a nanoparticle can be elongated such that an aspect ratio is higher than 1:1. For example, the aspect ratio can be about 1:2, 1:3, 1:4, 1:5, 1:6, 1:7, 1:8, 1:9, or about 1:10.

Figure 1B:
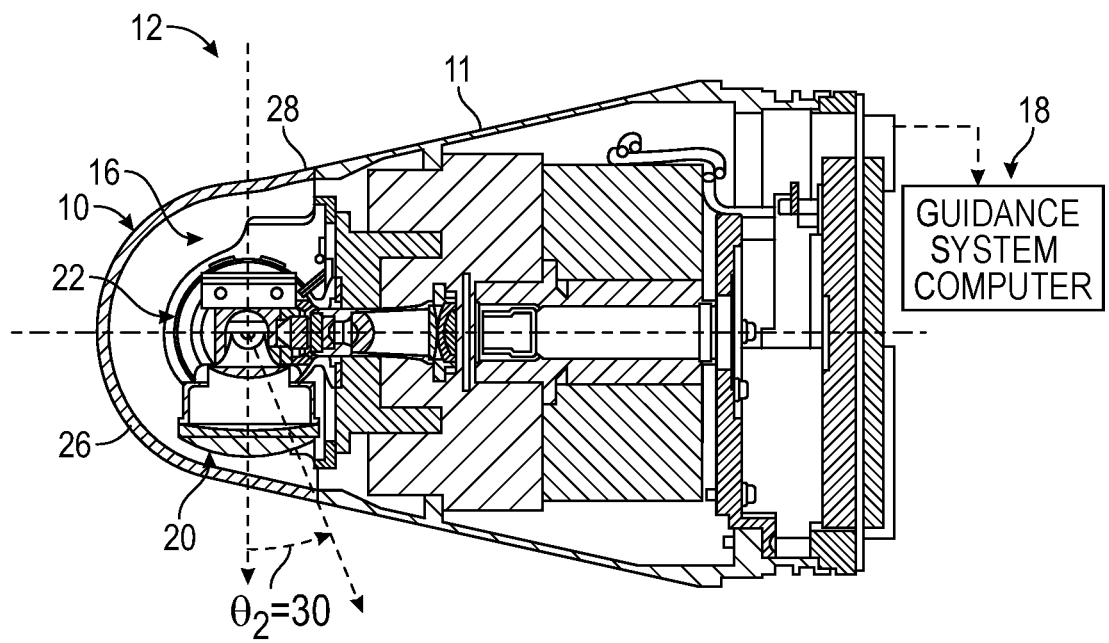

The optical window (e.g., radome, dome segment of a dome surface or flat window) including the ceramic materials described herein can be incorporated into many systems or assemblies such a multi-spectral sensor system. For example, FIGS. 1A and 1B show an embodiment of a one-piece extended radome (hereinafter "dome") 10 mounted on the nose 11 of a guided projectile 12. In this embodiment, the nose 11 is attached to a projectile body (not shown) that includes a fuse assembly and warhead and one or more aerodynamic control surfaces. Behind the dome 10, and within the nose 11 of the guided projectile 12, an EO seeker 16 is provided for capturing images and conveying them to a guidance system computer 18 (FIG. 1B), which, in turn, controls aerodynamic control surfaces (e.g. fins, canards, etc.) to guide the guided projectile 12 to an object or point within the captured images. In this embodiment, the EO seeker 16 includes an objective lens 20 mounted on a gimbal mechanism 22 for movement in three degrees of freedom and a detector 24 receiving EMR passing through the objective lens 20 to the detector 24 (FIG. 1B), which, in turn, conveys target information (e.g. bearing or images) to the guidance system computer 18 (FIG. 1B).

In one embodiment, the gimbal mechanism 22 moves the object lens 20 in three degrees of freedom through a spanning angle greater than 180 degrees (look angle θ greater than 90 degrees) without vignetting. In another embodiment, additional EO components such as an infrared light sensor and processing circuitry to process output signals of the infrared light sensor are positioned behind and adjacent to the extended portion of the dome 10 to receive or transmit EMR through the extended portion of the dome 10. In this latter case, the gimbal mechanism 22 may move the objective lens 20 through a spanning angle that may be less than or greater than 180 degrees, depending on the configuration of the EO seeker 16.

Figure 2A:
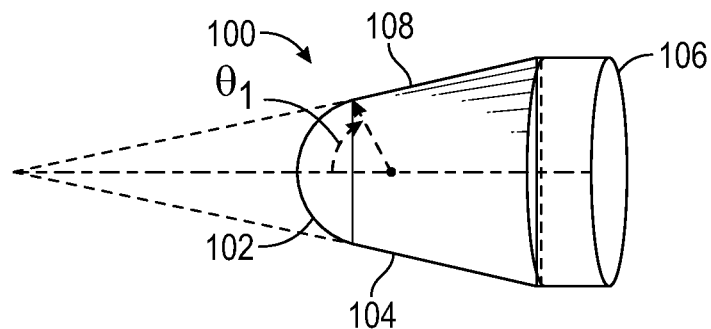
FIGS. 2A-2C are section views of different sphero-conical geometries of various domes in accordance with various embodiments.
Figure 2B:
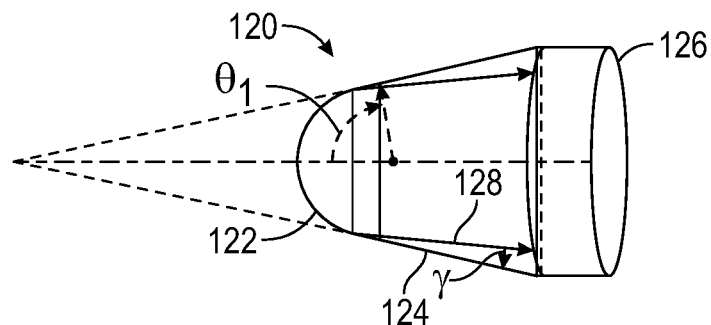
Figure 2C:
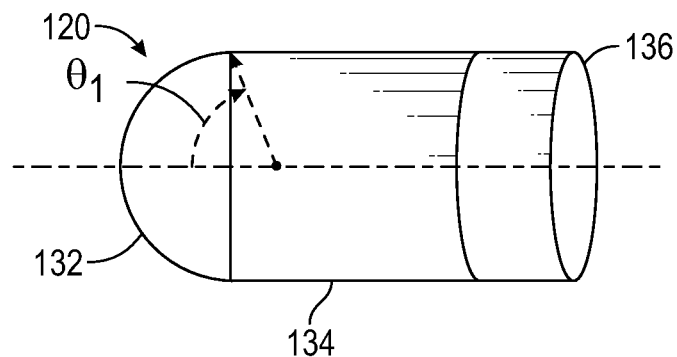

The optical window described herein can conform to many suitable shapes. FIGS. 2A through 2C illustrate different embodiments of a sphero-conical dome. Referring now to FIG. 2A, a one-piece extended dome 100 integrally formed of the multi-phase ceramic material comprises a leading spherical shape 102 and a trailing conical shape 104 that flares the diameter of the dome from the diameter of the spherical shape to the diameter of the platform 106. The conical geometric shape has inner and outer surfaces tangent to inner and outer surfaces respectively of the spherical shape at the point of seamless transition. In other words, lines 108 tangent to the surfaces of the spherical shape at the transition are coincident with the conical shape. In this case, the look angle Θ1 of spherical shape 102 is selected to satisfy this constraint. That angle will depend upon the platform diameter and any overall length limitation on the dome itself. This approach ensures a smooth physical transition between the spherical and conical shapes but may not maximize the look angle of the spherical shape, which is generally desirable.

Referring now to FIG. 2B, a one-piece extended dome 120 integrally formed of a multi-phase ceramic material comprises a leading spherical shape 122 and a trailing conical shape 124 that flares the diameter of the dome from the diameter of the spherical shape to the diameter of the platform 126. The conical shape has inner and outer surfaces that form a non-zero positive angle γ to surfaces 128 tangent to inner and outer surfaces respectively of the spherical shape at the point of seamless transition. In other words, the conical shape forms a skirt that flares outwards at a larger angle to transition from the diameter of the spherical shape to the platform diameter. In this case, the look angle Θ1 of spherical shape 122 is suitably selected to be as close to 90° as practicable. This maximizes the look angle of the spherical shape.

Referring now to FIG. 2C, a one-piece extended dome 130 integrally formed of the multi-phase ceramic material comprises a leading spherical shape 132 and a trailing conical shape 134 that extends the dome to platform 136. This is a special case in which the diameter of the spherical section equals the diameter of the platform. In this special case the apex of the conical shape is at infinity whereby the conical shape becomes a cylinder. The surfaces of the cone lie at a non-zero negative angle with respect to the tangent surfaces of the spherical shape unless the spherical shape is 90 degrees in which case they are tangent.

Figure 3:
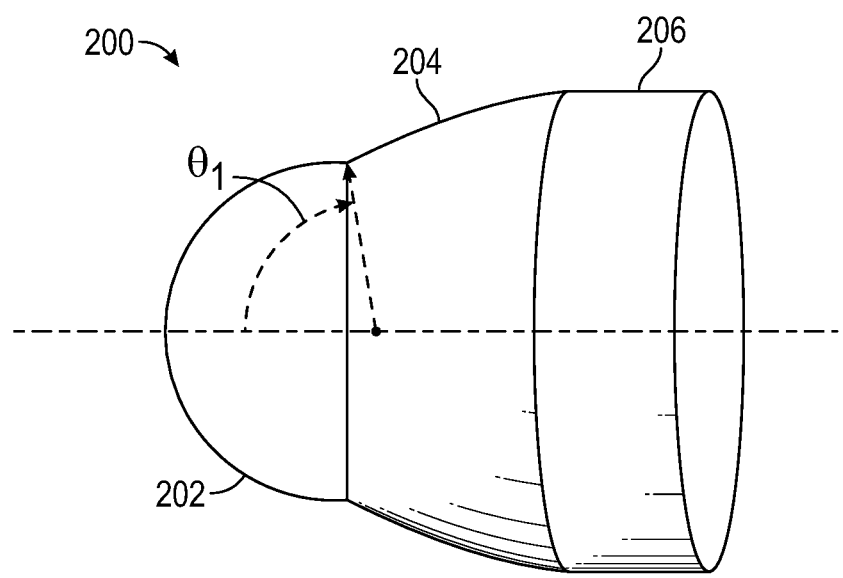
FIG. 3 is a section view of a sphero-ogive geometry of various domes in accordance with various embodiments.

Referring now to FIG. 3, a one-piece extended dome 200 integrally formed of the multi-phase ceramic material includes a leading spherical shape 202 and a trailing ogive shape 204 that flares the diameter of the dome from the diameter of the spherical shape to the diameter of the platform 206. In the extremes as the radius gets larger the arc flattens approaching a cone and as the radius gets smaller the arc gets more pronounced approaching a hemisphere.

The co-doped ceramic materials can be deliverable in a number of different configurations, in addition to those described above, such as disks, hemispherical and ogive domes of various sizes (e.g., a few centimeters (cm) in diameter up to several cm in diameter, e.g., between about five (5) and nine (9) cm, such as about 7.64 cm), although the disclosure is not so limited. The co-doped ceramic materials described herein are also expected to be useful in even larger configurations, including configurations not yet employed for use in a variety of applications, such as various types and sizes of domes, lenses, flats and windows. Such improvements in properties enable the materials described herein to be useful in missions which not only experience harsher environmental conditions, but in missions which are faster (e.g., Mach 6 or higher), longer and hotter than conditions currently achievable with conventional materials.

Figure 4:
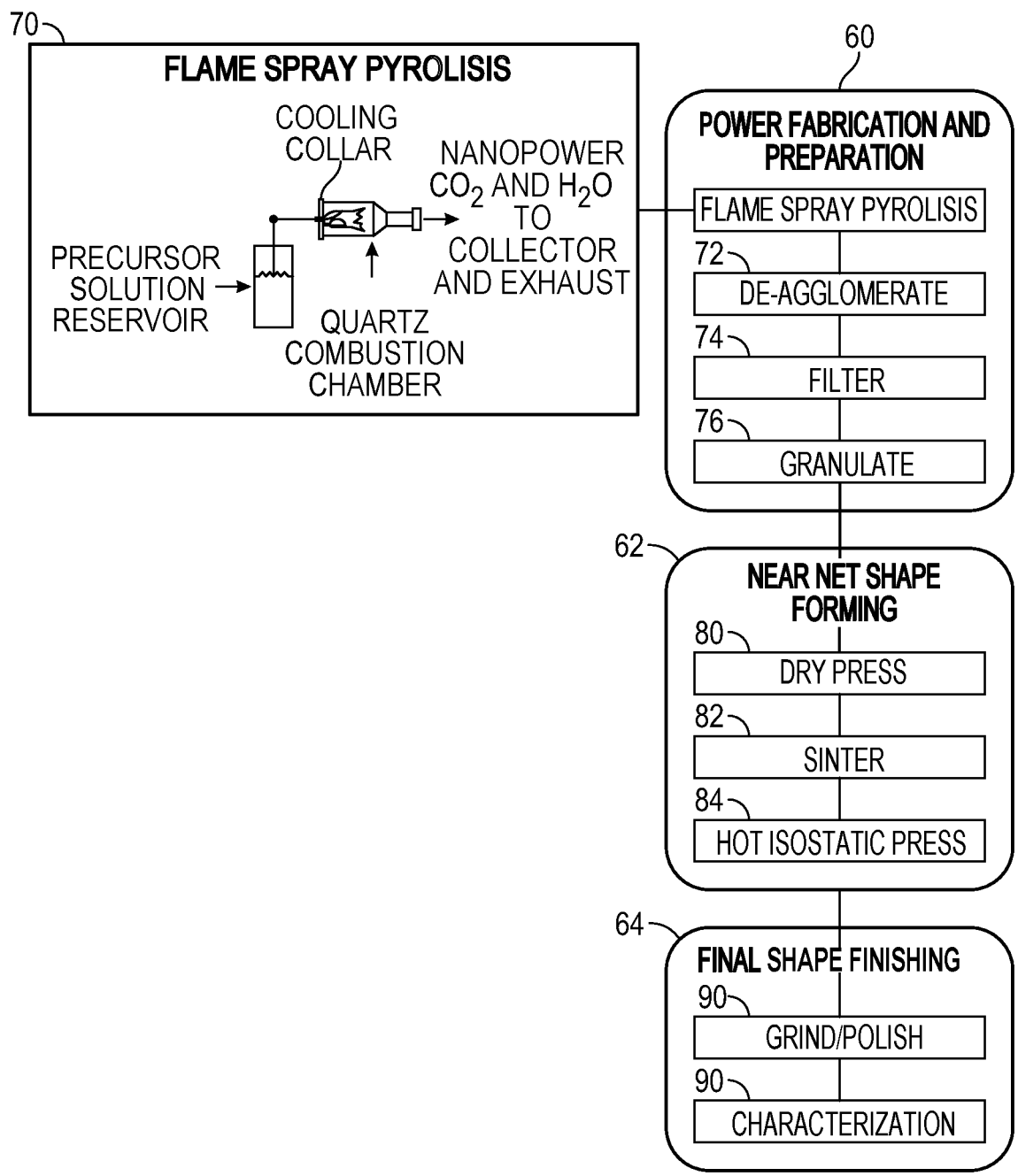
FIG. 4 is a flow diagram for manufacture of a one-piece extended dome from a co-doped nanocomposite optical ceramic material in accordance with various embodiments.

The dome or radomes described herein can be manufactured according to many suitable methods. For example, referring now to FIG. 4, an embodiment for integrally forming a one-piece extended dome from two individually doped ceramic powders includes the steps of powder fabrication and preparation (step 60), near net shape forming (step 62) and final shape finishing (step 64). Fabrication and preparation may use a Flame Spray Pyrolysis (FSP) to provide a precursor solution of nano-sized doped ceramic powders (step 70). Other techniques may also be employed to provide the precursor solution, which is de-agglomerated (step 72) e.g., ground and mixed with a mill, to break up any clumps. The solution is then filtered (step 74) to remove impurities and any residual large particles from the solution. The solution is granulated (step 76) to remove the liquid solution to form a dry powder. Near net shape forming may be accomplished using a dry press process (step 80) in which the powder is packed into a mold of the desired extended dome and pressure is applied to produce a green body of the desired near net shape. A sintering process (step 82) applies heat to densify the green body. A hot isostatic press (step 84) applies heat and pressure to complete densification and eliminate any remaining voids to make a fully dense dome blank. Final shape finishing includes precision grinding and polishing (step 90) the surface of the dome to the finished shape and characterization (step 92) of the dome's mechanical and optical properties to verify the dome meets the specifications.

EXAMPLES

Various embodiments of the present disclosure can be better understood by reference to the following Examples which are offered by way of illustration. The present disclosure is not limited to the Examples given herein.

Modeling showed that by index matching respective ceramic phases by co-doping, it was possible to improve the transmission of ultraviolet, visible, and infrared light through a material including the ceramic phases. Modeling included studying the behavior of light with respect to transmittance, reflectance, absorbance, and scatter as shown in equation 1.

$$t+r+a+s=1 \quad \text{(Eqn 1)}$$

t=transmission
r=reflection
a=absorption
s=scatter

A material to be used according to the embodiments described herein can be desired to have high transmission light of the wavelength of interest (e.g., infrared) with very low absorptance, and scatter. It was understood that in ceramics containing two or more phases there can be significant optical loss due to scatter at lower wavelengths. It was determined that fully dense ceramic composites with two or more phases, the driving factors for optical loss include grain size, and difference in refractive index between phases. This is shown by the Rayleigh model for scatter in a composite (equation 2).

$$\gamma = \frac{32}{9}\frac{\pi^4 a^3}{\lambda_0^4}(n_A^2 - n_B^2)^2 f_A(1-f_A)^2 \quad \text{(Eqn 2)}$$

(Rayleigh Model for scatter in a composite)
γ=scatter
a=average radius of nano-grain
$n_A$=refractive index of phase a
$n_B$=refractive index of phase b
$\lambda_0$=wavelength of light
$f_A$=volume fraction of phase a A basic interpretation of the Rayleigh Model is shown in equation 3, which shows that scatter is predominate at smaller wavelengths of light and is affected by grain size and difference in refractive index between phase A and phase B.

$$\gamma \propto \frac{a^3}{\lambda_0^4}(n_A^2 - n_B^2)^2 \quad \text{(Eqn 3)}$$

Using a combination of equations 1 and 2 it was possible to model the optical losses from scatter, and total transmittance of a composite ceramic. Modeling showed that increasing the amount of dopants in each individual phase brought the Δn term closer to zero. This allowed shorter wavelengths of light to transmit through the co-doped ceramic without being substantially scattered. Modeling also showed that it was favorable to keep the grain size of the ceramic composite as small as possible. Modeling further showed that at lower wavelengths, such as 1 µm there was an increase from 0% transmission to greater than 50% transmission. At 1.5 µm there was in increase from 45% transmission to greater than 70% transmission. Although these models considered two phase ceramic composites, it is understood that this disclosure is equally applicable to any ceramic composite having any plural number of phases wherein a total difference in the refractive index of the phases is within those described above.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Additional Embodiments

The following exemplary embodiments are provided, the numbering of which is not to be construed as designating levels of importance:

Embodiment 1 provides an optical window comprising:
an infrared light transmissive optical material, comprising:
 a first ceramic phase comprising a first ceramic material and a first dopant distributed therein; and
 a second ceramic phase homogenously intermixed with the first ceramic phase and comprising a second ceramic material and a second dopant distributed therein;
wherein
 the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant, and
 the first dopant and the second dopant are present in an amount such that a difference in a refractive index of the first ceramic phase and of the second ceramic phase is in a range of from about 0.001 to about 0.2.

Embodiment 2 provides the optical window of Embodiment 1, wherein the first ceramic material comprises yttria and the second ceramic material comprises magnesia and the first ceramic phase and the second ceramic phase are independently in a range of from about 10 vol % to about 90 vol % of the optical material.

Embodiment 3 provides the optical window of any one of Embodiments 1 or 2, wherein the first dopant and the second dopant independently comprise a metal oxide.

Embodiment 4 provides the optical window of Embodiment 3, wherein the first ceramic phase comprises magnesium oxide, and the first dopant comprises zinc oxide, calcium oxide, or a mixture thereof zinc oxide and calcium oxide and the second ceramic phase comprises yttrium oxide, or a mixture thereof, and second dopant comprises scandium oxide, gadolinium oxide, or a mixture thereof.

Embodiment 5 provides the optical window of any one of Embodiments 1-4, wherein the first dopant is in a range of from about 2 wt % to about 20 wt % of the first ceramic phase.

Embodiment 6 provides the optical window of any one of Embodiments 1-5, wherein the first dopant and the second dopant are present in an amount such that a difference in a refractive index of the first ceramic material and a second ceramic material is in a range of from about 0.001 to about 0.19.

Embodiment 7 provides the optical window of any one of Embodiments 1-6, wherein the first dopant is homogenously distributed about the first ceramic phase and the second dopant is homogenously distributed about the second ceramic phase.

Embodiment 8 provides the optical window of any one of Embodiments 1-7, wherein a an in-line transmittance of infrared radiation of the optical element is in a range of from about 80% to about 100% and an emittance of the optical material is in a range of from about 0 to about 0.3.

Embodiment 9 provides the optical window of Embodiment 8, wherein an in-line transmittance of infrared radiation of the optical element is in a range of from about 90% to about 100% and an emittance of the optical material is in a range of from about 0 to about 0.1.

Embodiment 10 provides a multi-spectral sensor, comprising:

an infrared light transmissive optical material, comprising:

a first ceramic phase comprising a first ceramic material and a first dopant distributed therein; and a second ceramic phase homogenously intermixed with the first ceramic phase and comprising a second ceramic material and a second dopant distributed therein;

wherein the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant, and the first dopant and the second dopant are present in an amount such that a difference in a refractive index of the first ceramic phase and of the second ceramic phase is in a range of from about 0.001 to about 0.2;

an infrared light sensor responsive to infrared light received through optically coupled to the infrared light transmissive optical material; and processing circuitry to process output signals of the infrared light sensor.

Embodiment 11 provides the multi-spectral sensor of Embodiment 10, wherein the first ceramic material comprises yttria and the second ceramic material comprises magnesia and the first ceramic phase and the second ceramic phase are independently in a range of from about 10 vol % to about 90 vol % of the optical material.

Embodiment 12 provides the multi-spectral sensor of any one of Embodiments 10 or 11, wherein the first ceramic material comprises yttria and the second ceramic material comprises magnesia and the first ceramic phase and the second ceramic phase are independently in a range of from about 5 vol % to about 95 vol % of the optical material.

Embodiment 13 provides the multi-spectral sensor of any one of Embodiments 10-12, wherein the first dopant of phase 2 comprises zinc oxide and the second dopant of phase 1 comprises scandium oxide.

Embodiment 14 provides the multi-spectral sensor of any one of Embodiments 10-13, wherein the first dopant and the second dopant are present in an amount such that a difference in a refractive index of the first ceramic material and a second ceramic material is in a range of from about 0.001 to about 0.2.

Embodiment 15 provides the multi-spectral sensor of any one of Embodiments 10-14, wherein an in-line transmittance of infrared radiation of the optical element is in a range of from about 80% to about 100% and an emittance of the optical material is in a range of from about 0 to about 0.3.

Embodiment 16 provides the multi-spectral sensor of any one of Embodiments 10-15, wherein the first dopant is homogenously distributed about the first ceramic phase and the second dopant is homogenously distributed about the second ceramic phase.

Embodiment 17 provides an infrared light transmissive optical material, comprising:

a first ceramic phase comprising a first ceramic material and a first dopant distributed therein; and a second ceramic phase homogenously intermixed with the first ceramic phase and comprising a second ceramic material and a second dopant distributed therein;

wherein the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant, and the first dopant and the second dopant are present in an amount such that a difference in a refractive index of the first ceramic phase and of the second ceramic phase is in a range of from about 0.001 to about 0.2.

Embodiment 18 provides the infrared light transmissive optical material of Embodiment 17, wherein the first ceramic material comprises yttria and the second ceramic material comprises magnesia and the first ceramic phase and the second ceramic phase are independently in a range of from about 10 vol % to about 90 vol % of the optical material.

Embodiment 19 provides the infrared light transmissive optical material of any one of Embodiments 17 or 18, wherein the first dopant comprises nickel oxide and the second dopant comprises calcium oxide.

Embodiment 20 provides the infrared light transmissive optical material of any one of Embodiments 17-19, wherein the first dopant and the second dopant are present in an amount such that a difference in a refractive index of the first ceramic material and a second ceramic material is in a range of from about 0.001 to about 0.19.

The invention claimed is:

1. An optical window comprising:
an infrared light transmissive optical material, comprising:
a first ceramic phase comprising a first ceramic material and a first dopant distributed therein; and
a second ceramic phase homogenously intermixed with the first ceramic phase and comprising a second ceramic material and a second dopant distributed therein;
wherein
the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant, and
the first dopant and the second dopant independently range from about 0.5 wt % to about 50 wt % of the first ceramic phase and second ceramic phase, respectively and are present in an amount such that a difference in a refractive index of the first ceramic phase and of the second ceramic phase is in a range of from about 0.001 to about 0.2.

2. The optical window of claim 1, wherein the first ceramic material comprises yttria and the second ceramic material comprises magnesia and the first ceramic phase and the second ceramic phase are independently in a range of from about 10 vol % to about 90 vol % of the optical material.

3. The optical window of claim 1, wherein the first dopant and the second dopant independently comprise a metal oxide.

4. An optical window comprising:
an infrared light transmissive optical material, comprising:
a first ceramic phase comprising a first ceramic material and a first dopant distributed therein; and
a second ceramic phase homogenously intermixed with the first ceramic phase and comprising a second ceramic material and a second dopant distributed therein;
wherein
the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant,
the first dopant and the second dopant are present in an amount such that a difference in a refractive index of the first ceramic phase and of the second ceramic phase is in a range of from about 0.001 to about 0.2, and
the first ceramic phase comprises magnesium oxide, and the first dopant comprises zinc oxide, calcium oxide, or a mixture thereof and calcium oxide and the second ceramic phase comprises yttrium oxide, and second dopant comprises scandium oxide, gadolinium oxide, or a mixture thereof.

5. The optical window of claim 1, wherein the first dopant is in a range of from about 2 wt % to about 20 wt % of the first ceramic phase.

6. The optical window of claim 1, wherein the first dopant and the second dopant are present in an amount such that a difference in a refractive index of the first ceramic material and a second ceramic material is in a range of from about 0.001 to about 0.19.

7. The optical window of claim 1, wherein the first dopant is homogenously distributed about the first ceramic phase and the second dopant is homogenously distributed about the second ceramic phase.

8. The optical window of claim 1, wherein an in-line transmittance of infrared radiation of the optical element is in a range of from about 50% to about 100% and an emittance of the optical material is in a range of from about 0 to about 0.3.

9. The optical window of claim 8, wherein an in-line transmittance of infrared radiation of the optical element is in a range of from about 90% to about 100% and an emittance of the optical material is in a range of from about 0 to about 0.1.

10. A multi-spectral sensor, comprising:
an infrared light transmissive optical material, comprising:
a first ceramic phase comprising a first ceramic material and a first dopant distributed therein; and
a second ceramic phase homogenously intermixed with the first ceramic phase and comprising a second ceramic material and a second dopant distributed therein;
wherein
the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant, and
the first dopant and the second dopant independently range from about 0.5 wt % to about 50 wt % of the first ceramic phase and second ceramic phase, respectively and are present in an amount such that a difference in a refractive index of the first ceramic phase and of the second ceramic phase is in a range of from about 0.001 to about 0.2;
an infrared light sensor responsive to infrared light received through optically coupled to the infrared light transmissive optical material; and
processing circuitry to process output signals of the infrared light sensor.

11. The multi-spectral sensor of claim 10, wherein the first ceramic material comprises yttria and the second ceramic material comprises magnesia and the first ceramic phase and the second ceramic phase are independently in a range of from about 10 vol % to about 90 vol % of the optical material.

12. The multi-spectral sensor of claim 10, wherein the first ceramic material comprises doped yttria and the second ceramic material comprises doped magnesia and the first ceramic phase and the second ceramic phase are independently in a range of from about 5 vol % to about 95 vol % of the optical material.

13. A multi-spectral sensor, comprising:
an infrared light transmissive optical material, comprising:
a first ceramic phase comprising a first ceramic material and a first dopant distributed therein; and
a second ceramic phase homogenously intermixed with the first ceramic phase and comprising a second ceramic material and a second dopant distributed therein;
wherein
the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant, and
the first dopant and the second dopant are present in an amount such that a difference in a refractive index of the first ceramic phase and of the second ceramic phase is in a range of from about 0.001 to about 0.2;
an infrared light sensor responsive to infrared light received through optically coupled to the infrared light transmissive optical material;
processing circuitry to process output signals of the infrared light sensor; and
the first dopant of the second phase comprises zinc oxide and the second dopant of first phase comprises scandium oxide.

14. The multi-spectral sensor of claim 10, wherein the first dopant and the second dopant are present in an amount such that a difference in a refractive index of the first ceramic material and a second ceramic material is in a range of from about 0.001 to about 0.2.

15. The multi-spectral sensor of claim 10, wherein an in-line transmittance of infrared radiation of the optical element is in a range of from about 50% to about 100% and an emittance of the optical material is in a range of from about 0 to about 0.3.

16. The multi-spectral sensor of claim 10, wherein the first dopant is homogenously distributed about the first ceramic phase and the second dopant is homogenously distributed about the second ceramic phase.

17. An infrared light transmissive optical material, comprising:
a first ceramic phase comprising a first ceramic material and a first dopant distributed therein; and
a second ceramic phase homogenously intermixed with the first ceramic phase and comprising a second ceramic material and a second dopant distributed therein;
wherein
the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant, and
the first dopant and the second dopant independently range from about 0.5 wt % to about 50 wt % of the first ceramic phase and second ceramic phase, respectively and are present in an amount such that a difference in a refractive index of the first ceramic phase and of the second ceramic phase is in a range of from about 0.001 to about 0.2.

18. The infrared light transmissive optical material of claim 17, wherein the first ceramic material comprises yttria and the second ceramic material comprises magnesia and the first ceramic phase and the second ceramic phase are independently in a range of from about 10 vol % to about 90 vol % of the optical material.

19. An infrared light transmissive optical material, comprising:
a first ceramic phase comprising a first ceramic material and a first dopant distributed therein; and
a second ceramic phase homogenously intermixed with the first ceramic phase and comprising a second ceramic material and a second dopant distributed therein;
wherein
the first dopant increases the refractive index of the first ceramic material, relative to a refractive index of a corresponding first ceramic material that is free of the first dopant and the second dopant decreases the refractive index of the second ceramic material, relative to a refractive index of a corresponding second ceramic material that is free of the second dopant,
the first dopant and the second dopant are present in an amount such that a difference in a refractive index of the first ceramic phase and of the second ceramic phase is in a range of from about 0.001 to about 0.2, and
the first dopant comprises nickel oxide and the second dopant comprises calcium oxide.

20. The infrared light transmissive optical material of claim 17, wherein the first dopant and the second dopant are present in an amount such that a difference in a refractive index of the first ceramic material and a second ceramic material is in a range of from about 0.001 to about 0.19.

21. The optical window of claim 1, wherein the infrared light transmissive optical material comprises one selected from the group consisting of the first ceramic phase comprises yttrium oxide, the first dopant comprises scandium oxide the second ceramic phase comprises magnesium oxide, and the second dopant comprises zinc oxide;
the first ceramic phase comprises yttrium oxide, the first dopant comprises gadolinium oxide the second ceramic phase comprises magnesium oxide, and the second dopant comprises zinc oxide;
the first ceramic phase comprises yttrium oxide, the first dopant comprises scandium oxide the second ceramic phase comprises magnesium oxide, and the second dopant comprises calcium oxide;
the first ceramic phase comprises yttrium oxide, the first dopant comprises gadolinium oxide the second ceramic phase comprises magnesium oxide, and the second dopant comprises calcium oxide;
the first ceramic phase comprises yttrium oxide, the first dopant comprises scandium oxide the second ceramic phase comprises magnesium oxide, and the second dopant comprises nickel oxide; and
the first ceramic phase comprises yttrium oxide, the first dopant comprises gadolinium oxide the second ceramic phase comprises magnesium oxide, and the second dopant comprises nickel oxide.

22. The multi-spectral sensor of claim 10, wherein the infrared light transmissive optical material comprises one selected from the group consisting of
the first ceramic phase comprises yttrium oxide, the first dopant comprises scandium oxide the second ceramic phase comprises magnesium oxide, and the second dopant comprises zinc oxide;
the first ceramic phase comprises yttrium oxide, the first dopant comprises gadolinium oxide the second ceramic phase comprises magnesium oxide, and the second dopant comprises zinc oxide;
the first ceramic phase comprises yttrium oxide, the first dopant comprises scandium oxide the second ceramic phase comprises magnesium oxide, and the second dopant comprises calcium oxide;
the first ceramic phase comprises yttrium oxide, the first dopant comprises gadolinium oxide the second ceramic phase comprises magnesium oxide, and the second dopant comprises calcium oxide;
the first ceramic phase comprises yttrium oxide, the first dopant comprises scandium oxide the second ceramic phase comprises magnesium oxide, and the second dopant comprises nickel oxide; and
the first ceramic phase comprises yttrium oxide, the first dopant comprises gadolinium oxide the second ceramic phase comprises magnesium oxide, and the second dopant comprises nickel oxide.

23. The infrared light transmissive optical material of claim 17, wherein the infrared light transmissive optical material comprises one selected from the group consisting of
the first ceramic phase comprises yttrium oxide, the first dopant comprises scandium oxide the second ceramic phase comprises magnesium oxide, and the second dopant comprises zinc oxide;
the first ceramic phase comprises yttrium oxide, the first dopant comprises gadolinium oxide the second ceramic phase comprises magnesium oxide, and the second dopant comprises zinc oxide;
the first ceramic phase comprises yttrium oxide, the first dopant comprises scandium oxide the second ceramic phase comprises magnesium oxide, and the second dopant comprises calcium oxide;

the first ceramic phase comprises yttrium oxide, the first dopant comprises gadolinium oxide the second ceramic phase comprises magnesium oxide, and the second dopant comprises calcium oxide;

the first ceramic phase comprises yttrium oxide, the first dopant comprises scandium oxide the second ceramic phase comprises magnesium oxide, and the second dopant comprises nickel oxide; and the first ceramic phase comprises yttrium oxide, the first dopant comprises gadolinium oxide the second ceramic phase comprises magnesium oxide, and the second dopant comprises nickel oxide.

* * * * *